United States Patent
Lin et al.

(10) Patent No.: US 8,897,392 B2
(45) Date of Patent: Nov. 25, 2014

(54) TRANSMIT DIVERSITY METHOD APPLIED TO A TRANSMITTING SYSTEM AND TRANSMITTING SYSTEM HAVING MULTI-TRANSMISSION PATHS THEREOF

(75) Inventors: Yu-Nan Lin, Hsinchu (TW); Kuang-Yu Yen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 969 days.

(21) Appl. No.: 12/942,973

(22) Filed: Nov. 9, 2010

(65) Prior Publication Data

US 2011/0116575 A1  May 19, 2011

(30) Foreign Application Priority Data

Nov. 13, 2009 (TW) .............................. 98138644 A

(51) Int. Cl.
- H04L 27/00 (2006.01)
- H04B 7/06 (2006.01)
- H04L 27/26 (2006.01)
- H04L 25/02 (2006.01)

(52) U.S. Cl.
CPC .............. H04B 7/0608 (2013.01); H04B 7/068 (2013.01); H04L 27/2626 (2013.01); H04L 25/0204 (2013.01)
USPC ........................................................ 375/299

(58) Field of Classification Search
USPC ........................................................ 375/299
See application file for complete search history.

(56) References Cited

U.S. PATENT DOCUMENTS

| | | | | |
|---|---|---|---|---|
| 5,369,801 A | * | 11/1994 | Smith | 455/277.1 |
| 2003/0012299 A1 | * | 1/2003 | Kuchi et al. | 375/299 |
| 2007/0184849 A1 | * | 8/2007 | Zheng | 455/456.1 |
| 2007/0291638 A1 | * | 12/2007 | Chae et al. | 370/208 |
| 2009/0135925 A1 | | 5/2009 | Hamaguchi | |
| 2010/0091896 A1 | * | 4/2010 | Lee et al. | 375/260 |

FOREIGN PATENT DOCUMENTS

CN  101064701 A  10/2007
WO  2008044830 A1  4/2008

OTHER PUBLICATIONS

"IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput," IEEE Std 802.11n-2009; Publication Year: 2009 , pp. 1-565.*

* cited by examiner

*Primary Examiner* — Michael Neff
*Assistant Examiner* — Nader Bolourchi
(74) *Attorney, Agent, or Firm* — Winston Hsu; Scott Margo

(57) ABSTRACT

A transmit diversity method applied to a transmitting system includes the steps of: receiving a serial stream, and transforming the serial stream into a plurality of parallel streams, wherein each parallel stream is carried by a corresponding sub-carrier; and in light of each sub-carrier, selecting a single transmission path from at least two transmission paths of the transmitting system so as to transmit the parallel stream carried by the sub-carrier. The transmit diversity method further includes the step of: dividing the plurality of parallel streams carried by the sub-carries into M groups, wherein the parallel streams belonging to the same group are transmitted via selecting the same transmission path.

24 Claims, 11 Drawing Sheets

TRANSMIT DIVERSITY METHOD APPLIED TO A TRANSMITTING SYSTEM AND TRANSMITTING SYSTEM HAVING MULTI-TRANSMISSION PATHS THEREOF

BACKGROUND OF THE INVENTION

1. Field of the Invention

The present invention relates to a transmit diversity method applied to a transmitting system and related transmitting system, and more particularly, to a method and a system for selecting a single transmission path from at least two transmission paths of the transmitting system in order to transmit parallel stream carried by each sub-carrier.

2. Description of the Prior Art

Orthogonal frequency division multiplexing (OFDM) technology has been widely adopted in high-speed wireless LAN network. In order to improve the transceiving quality, a transmitting system currently on the market is usually equipped with multiple transmission paths to transmit a plurality of signals simultaneously. However, use of multiple transmission paths will cause the hardware cost of the transmitting system increased, and the device itself cannot improve the transceiving quality by the way of increasing the number of the transmission paths. For this reason, a transmit diversity technology can be adopted for improving the receiving quality of the receiving end.

The simplest approach of the transmit diversity is to directly use multiple transmission paths to transmit signals without any treatment. However, since the transmitting signals in the wireless channel will arrive the receiving end via different paths, the transmitting signals will produce constructive and destructive superposition effects at the receiving end. Another simple approach is to use a cyclic shift technology, which inserts a specific delay in each OFDM time-domain signal. But this technology cannot solve the possibility of producing destructive superposition effects by multiple transmitting signals, and it only lowers the possibility of producing destructive superposition effects by multiple frequencies, which has an insignificant impact. Another possible approach is to use Space Time Block Code (STBC) OFDM coding, so that the receiving end can separate the transmitting signals from different transmission paths. But a condition that the receiving end equipped with the STBC decoding ability is required when adopting this method. In addition, a beam-forming technology is to perform a signal pre-processing operation upon the transmitting signals in order to ensure that only constructive superposition effects are produced by the transmitting signals in the receiving end. But such approach needs accurate channel estimation at the receiving end, and the signal processing will cause a large burden in the hardware of the transmitting end.

SUMMARY OF THE INVENTION

It is therefore one of the objectives of the claimed invention to provide a transmit diversity method applied to a transmitting system and a related transmitting system to solve the abovementioned problems.

According to an exemplary embodiment of the present invention, a transmit diversity method applied to a transmitting system is provided. The transmit diversity method includes the steps of: receiving a serial stream, and transforming the serial stream into a plurality of parallel streams, wherein each parallel stream is carried by a corresponding sub-carrier; in light of each sub-carrier, selecting a single transmission path from at least two transmission paths of the transmitting system so as to transmit the parallel stream carried by the sub-carrier. The transmit diversity method can be applied to an OFDM transmission.

According to an exemplary embodiment of the present invention, a transmitting system having multi-transmission paths is provided. The transmitting system includes a serial-to-parallel transform circuit, at least two transmission paths, and a transmission path selector. The serial-to-parallel transform circuit receives a serial stream, and transforms the serial stream into a plurality of parallel streams, wherein each parallel stream is carried by a corresponding sub-carrier. The transmission path selector is coupled between the serial-to-parallel transform circuit and the at least two transmission paths. In light of each sub-carrier, the transmission path selector selects a single transmission path from the at least two transmission paths of the transmitting system so as to transmit the parallel stream carried by the sub-carrier.

These and other objectives of the present invention will no doubt become obvious to those of ordinary skill in the art after reading the following detailed description of the preferred embodiment that is illustrated in the various figures and drawings.

DETAILED DESCRIPTION

In the following embodiments, a transmit diversity method aimed at a transmitting system having multi-transmission paths is provided. Under a principle of not altering the architecture of the receiving end, the receiving end can have a better receiving quality by adopting the transmit diversity method disclosed in the present invention, which can be applied to OFDM transmissions. The main concept of the present invention is to adopt a transmission path selector for determining the transmission path used for transmitting the parallel stream carried by a sub-carrier for each sub-carrier before OFDM modulation. Because each sub-carrier is transmitted by selecting a single transmission path only, transmitting signals will not cause interfere with each other at the receiving end. Furthermore, since the number of transmitted sub-carriers on each transmission path is less than the original number of transmitted sub-carriers on each transmission path, the transmitting power of each transmission path can be appropriately increased. Therefore, the receiving energy at the receiving end will be stronger. In addition, the transmit diversity method disclosed in the present invention can adopt "a single sub-carrier" (see the embodiments mentioned in FIG. 1~FIG. 3 and FIG. 7~FIG. 8) or "a group" (having a plurality of sub-carriers) (see embodiments mentioned in FIG. 4~FIG. 6 and FIG. 9~FIG. 11) as a smallest unit for determining the transmission paths so as to construct an OFDM transmitting system. Please note that the energy of channel coefficients (or a summation of energies of channel coefficients) (see the embodiments mentioned shown in FIG. 2~FIG. 3 and FIG. 7~FIG. 10) or a summation of energies of receiving signals (see embodiments shown in FIG. 6 and FIG. 11) can be used as a basis for determining the transmission path of each sub-carrier.

Figure 1:
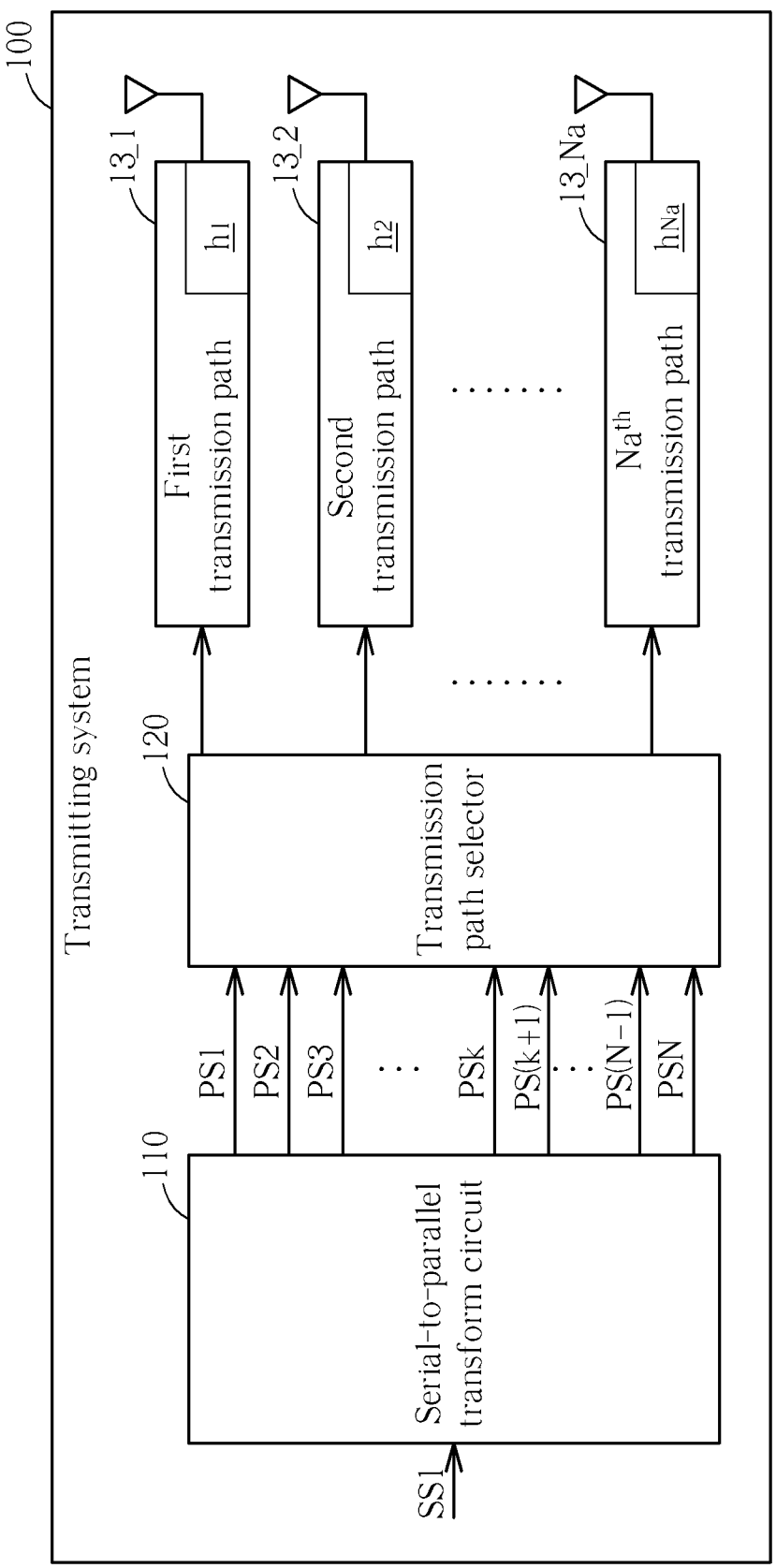
FIG. 1 is a block diagram of a transmitting system having multi-transmission paths according to a first embodiment of the present invention.

Please refer to FIG. 1. FIG. 1 is a block diagram of a transmitting system 100 having multi-transmission paths according to a first embodiment of the present invention. As FIG. 1 depicts, the transmitting system 100 includes, but is not limited to, a serial-to-parallel transform circuit 110, a transmission path selector 120, and at least two transmission paths 13_1~13_Na. The serial-to-parallel transform circuit 110 receives a serial stream SS1, and transforms the serial stream SS1 into a plurality of parallel streams PS1~PSN, wherein each parallel stream PS1~PSN is carried by a corresponding sub-carrier. In this embodiment, totally N parallel streams PS1~PSN are cited as an example for illustrating the present invention, that is to say, totally N sub-carriers SC1~SCN are required to carry the N parallel streams PS1~PSN. Moreover, the transmission path selector 120 is coupled between the serial-to-parallel transform circuit 110 and these transmission paths 13_1~13_Na. In light of each sub-carrier (e.g., SC1), the transmission path selector 120 selects a single transmission path from the transmission paths 13_1·13_Na so as to transmit the parallel stream (e.g., PS1) carried by the sub-carrier (e.g., SC1). That is to say, each sub-carrier (or each parallel stream) is transmitted by using a single transmission path only. Therefore, a problem that transmitting signals interference with each other at the receiving end (Rx) can be avoided. Operations of how the transmission path selector 120 chooses a suitable transmission path for each sub-carrier in order to transmit the parallel stream carried by the sub-carrier will be further detailed in the following embodiments.

In this embodiment, totally Na transmission paths 13_1~13_Na are cited as an example for illustrating the present invention, but the number of the transmission paths is not limited in the present invention. Please note that each of the transmission paths 13_1~13_Na has a channel coefficient. For example, the first transmission path 13_1 has a channel coefficient $h_1$, the second transmission path 13_2 has a channel coefficient $h_2$, the $Na^{th}$ transmission path has a channel coefficient $h_{Na}$, and so on. Furthermore, each of the transmission paths 13_1~13_Na can be implemented by an IFFT device, a guard interval insertion device, a digital-to-analog converter, and an RF transceiver (not shown), but this is not meant to be a limitation of the present invention.

Figure 2:
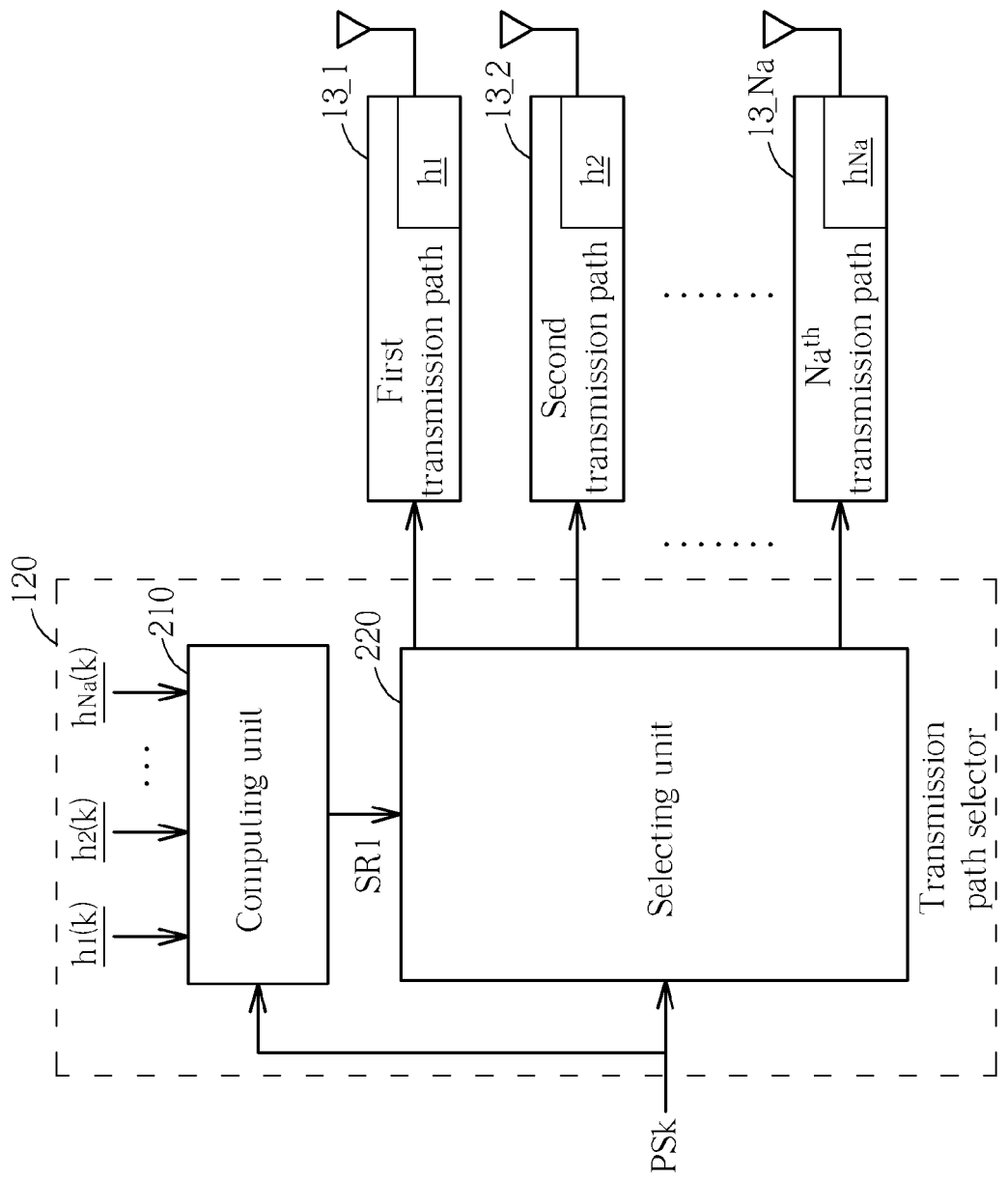
FIG. 2 is diagram illustrating an exemplary embodiment of the transmission path selector shown in FIG. 1.

Please refer to FIG. 2. FIG. 2 is diagram illustrating an exemplary embodiment of the transmission path selector shown in FIG. 1. As shown in FIG. 2, the transmission path selector 120 includes a computing unit 210 and a selecting unit 220. The computing unit 210 is used for comparing energies of a plurality of channel coefficients corresponding to the transmission paths 13_1~13_Na on a $k^{th}$ sub-carrier SCk, i.e., $h_1(k), h_2(k) \ldots$, and $h_{Na}(k)$, in order to generate a comparison result SR1. The selecting unit 220 is coupled to the computing unit 210, for selecting a designated transmission path having a maximum energy of the channel coefficient from the transmission paths 13_1~13_Na according to the comparison result SR1, so as to transmit the parallel stream PSk carried by the $k^{th}$ sub-carrier SCk.

Please note that the receiving signal of the abovementioned $k^{th}$ sub-carrier SCk can be mathematically expressed as:

$$\underline{y}(k)=\underline{h}(k)s(k)+\underline{n}(k) \qquad (1);$$

where s(k) indicates the transmitting signal of the $k^{th}$ sub-carrier SCk, $\underline{h}(k)$ indicates a vector composed of the plurality of channel coefficients corresponding to the transmission paths 13_1~13_Na, $\underline{y}(k)$ indicates a vector composed of the receiving signals of the $k^{th}$ sub-carrier on all of the transmission paths 13_1~13_Na, and $\underline{n}(k)$ indicates a vector composed of the noise on all of the transmission paths 13_1~13_Na. As a result, the computing unit 210 and the selecting unit 220 shown in FIG. 2 can be mathematically expressed as:

$$i_T(k) = \arg\left\{\max_n |h_n(k)|^2, n = 1 \ldots Na\right\}; \qquad (2)$$

where $i_T(k)$ indicates the selected designated transmission path having the maximum energy of the channel coefficient, n indicates the $n^{th}$ transmission path.

Figure 3:
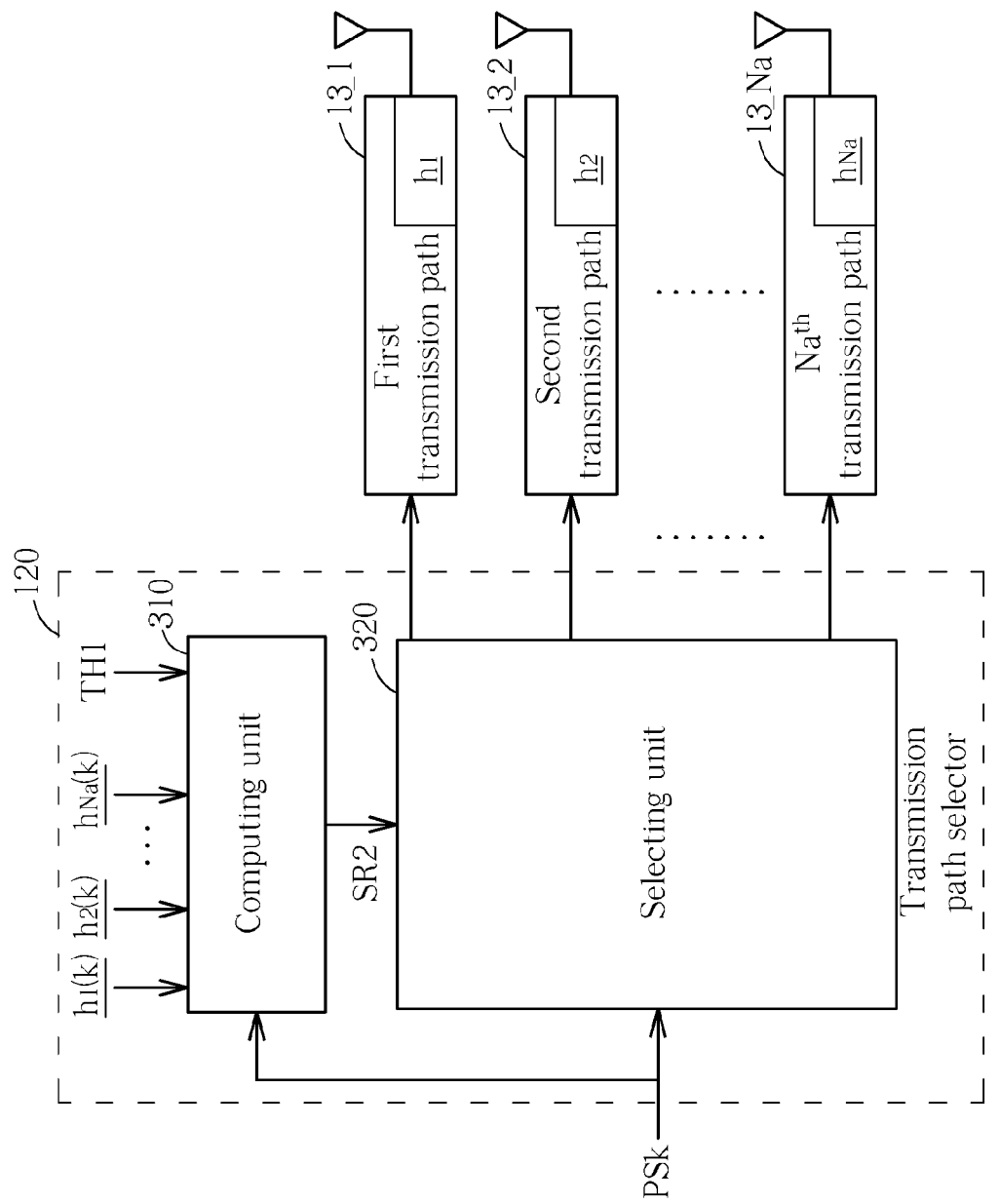
FIG. 3 is diagram illustrating another exemplary embodiment of the transmission path selector shown in FIG. 1.

Please refer to FIG. 3. FIG. 3 is diagram illustrating another exemplary embodiment of the transmission path selector 120 shown in FIG. 1. As shown in FIG. 3, the transmission path selector 120 includes a determining unit 310 and a selecting unit 320. The determining unit 310 is used for determining whether an energy of the channel coefficient of a first transmission path 131 on a $k^{th}$ sub-carrier is greater than a threshold TH1, that is determining whether $h_1(k)$>TH1, in order to generate a determining result SR2. The selecting unit 320 is coupled to the determining unit 310, for selecting to use the first transmission path 131 or other transmission paths (such as: the second transmission path 132) to transmit the parallel stream PSk carried by the $k^{th}$ sub-carrier according to the determining result SR2. For example, when the determining result SR2 indicates that the energy of the channel coefficient $h_1(k)$ of the first transmission path 131 on the $k^{th}$ sub-carrier is greater than the threshold TH1, the selecting unit 320 selects the first transmission path 131 to transmit the parallel stream PSk carried by the $k^{th}$ sub-carrier; on the other hand, when the determining result SR2 indicates that the energy of the channel coefficient $h_1(k)$ of the first transmission path 131 on the $k^{th}$ sub-carrier is smaller than the threshold TH1, the selecting unit 320 selects the second transmission path 132 to transmit the parallel stream PSk carried by the $k^{th}$ sub-carrier.

In one word, in this embodiment, a fixed transmission path (such as, the first transmission path 131) is used for transmitting the parallel stream PSk carried by the $k^{th}$ sub-carrier. However, when the energy of the channel coefficient $h_1(k)$ of the first transmission path 131 on the $k^{th}$ sub-carrier is too small (i.e., smaller than the threshold TH1), another transmission path (such as, the second transmission path 132) will be adopted for transmitting the parallel stream PSk carried by the $k^{th}$ sub-carrier.

Please note that, in the embodiments of FIG. 2 and FIG. 3, only the parallel stream PSk carried by the $k^{th}$ sub-carrier is cited for illustrating the present invention. Those skilled in the art should appreciate that operations related to the selections of the transmission paths corresponding to the parallel stream PS1~PSN carried by all of the sub-carriers SC1~SCN can be known based on the embodiments for illustrating the $k^{th}$ sub-carrier.

Figure 4:
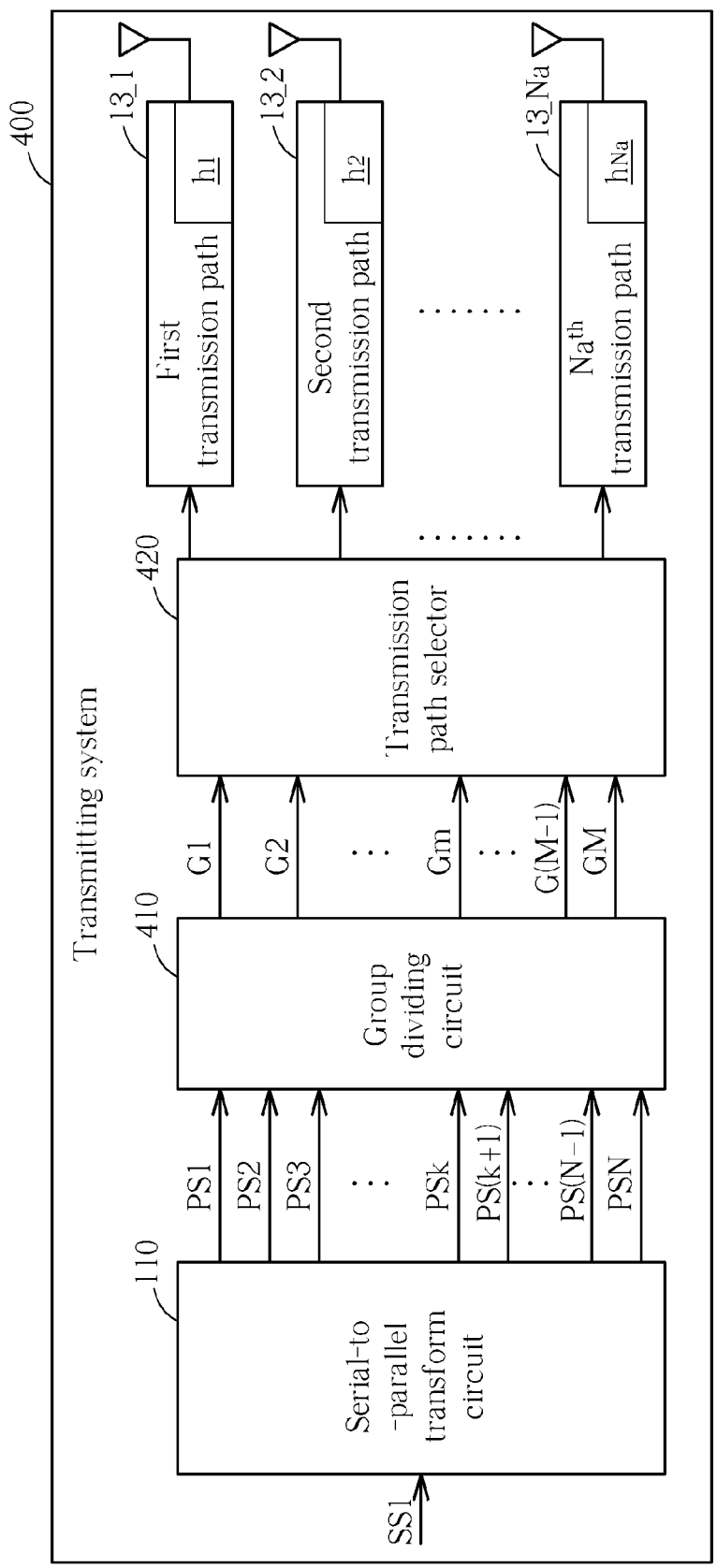
FIG. 4 is a block diagram of a transmitting system having multi-transmission paths according to a second embodiment of the present invention.

Please refer to FIG. 4. FIG. 4 is a block diagram of a transmitting system 400 having multi-transmission paths according to a second embodiment of the present invention. The architecture of the transmitting system 400 shown in FIG. 4 is similar to that of the transmitting system 100 shown in FIG. 1, and the difference between them is that the transmitting system 400 further includes a group dividing circuit 410 coupled between the serial-to-parallel transform circuit 110 and the transmission path selector 420, for dividing the plurality of parallel streams PS1~PSN carried by the sub-carries SC1~SCN into M groups G1~GM. What calls for special attention is that: the parallel streams belonging to the same group (e.g., the first group G1) are transmitted via selecting the same transmission path.

Furthermore, as can be known by comparing the transmitting system 400 shown in FIG. 4 with the transmitting system 100 shown in FIG. 1, the transmission path selector 120 of the transmitting system 100 uses "a single sub-carrier" as the smallest unit for determining the transmission path, while the transmission path selector 420 of the transmitting system 400 uses "a group" (having a plurality of sub-carriers) as the smallest unit for determining the transmission path.

Therefore, the transmission path selector 420 shown in FIG. 4 can also be implemented by adopting the exemplary embodiment of the transmission path selector 120 shown in FIG. 2 or FIG. 3. The difference is that: when the transmission path selector 420 shown in FIG. 4 is implemented by adopting the exemplary embodiment of the transmission path selector 120 shown in FIG. 2, the computing unit is used for comparing a summation of energies of the plurality of channel coefficients corresponding to the transmission paths 13_1~13_Na on all sub-carries belonging to a $m^{th}$ group, in order to generate a comparing result (such as: SR1'), and the selecting unit is used for selecting a designated transmission path having a maximum summation of energies of the channel coefficients from the transmission paths 13_1~13_Na so as to transmit the parallel streams carried by the sub-carriers belonging to the $m^{th}$ group according to the comparing result SR1'. Continued from the preceding example, in this embodiment, the computing unit and the selecting unit of the transmission path selector 420 can be mathematically expressed as:

$$i_T(m) = \arg\left\{\max_n\left\{\sum_{k \in Km} |h_n(k)|^2, n = 1 \ldots Na\right\}\right\}; \quad (3)$$

where $K_m$ indicates all of the sub-carriers belonging to the $m^{th}$ group, $i_T(m)$ indicates the selected designated transmission path having the maximum summation of energies of the channel coefficients, and n indicates the $n^{th}$ transmission path.

On the other hand, when the transmission path selector 420 shown in FIG. 4 is implemented by adopting the exemplary embodiment of the transmission path selector 120 shown in FIG. 3, the determining unit is used for determining whether a summation of energies of the channel coefficient of the first transmission path 131 on all sub-carriers belonging to a $m^{th}$ group Gm is greater than a threshold (e.g., TH2), in order to generate a determining result (e.g., SR2'); and the selecting unit is used for selecting to use the first transmission path 131 or other transmission paths (such as, the second transmission path 132) to transmit the parallel streams carried by the sub-carriers belonging to the $m^{th}$ group Gm according to the determining result SR2'. For example, when the determining result SR2' indicates that summation of energies of the channel coefficient of the first transmission path 131 on all sub-carriers belonging to the $m^{th}$ group Gm is greater than the threshold TH2, the selecting unit selects the first transmission path 131 to transmit the parallel streams carried by the sub-carriers belonging to the $m^{th}$ group Gm; and when the determining result SR2' indicates that summation of energies of the channel coefficient of the first transmission path 131 on all sub-carriers belonging to the $m^{th}$ group Gm is smaller than the threshold TH2, the selecting unit selects the second transmission path 132 to transmit the parallel streams carried by the sub-carriers belonging to the $m^{th}$ group Gm.

In one word, in this embodiment, a fixed transmission path (such as, the first transmission path 131) is used for transmitting the parallel streams carried by the sub-carriers belonging to the $m^{th}$ group Gm. However, when the summation of energies of the channel coefficient of the first transmission path 131 on all sub-carriers belonging to the $m^{th}$ group Gm is too small (i.e., smaller than the threshold TH2), another transmission path (such as, the second transmission path 132) will be adopted for transmitting the parallel streams carried by the sub-carriers belonging to the $m^{th}$ group Gm.

Figure 5:
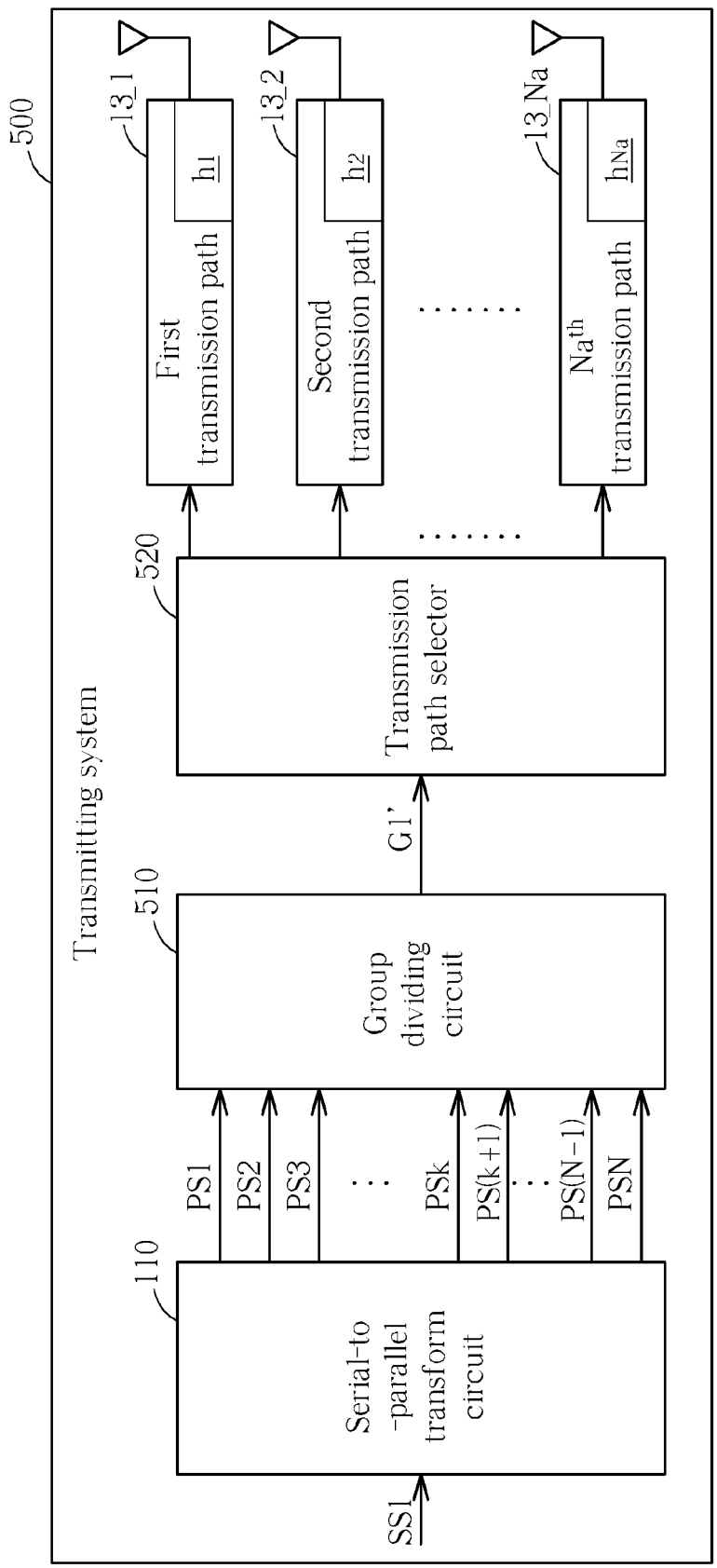
FIG. 5 is a block diagram of a transmitting system having multi-transmission paths according to a third embodiment of the present invention.

Please refer to FIG. 5. FIG. 5 is a block diagram of a transmitting system 500 having multi-transmission paths according to a third embodiment of the present invention. The architecture of the transmitting system 500 shown in FIG. 5 is similar to that of the transmitting system 400 shown in FIG. 4, which is a varied embodiment of the transmitting system 400. The difference between them is that: the group dividing circuit 510 of the transmitting system 500 is used for dividing the plurality of parallel streams PS1~PSN carried by the sub-carries SC1~SCN into an identical groups G1'. In other words, in this embodiment, all of the parallel streams PS1~PSN are transmitted via selecting the same transmission path. As a result, the selection of the transmission path can be determined purely depending on the strength of the received signals. That is to say, a transmission path having the received signals with stronger strength is selected to transmit all of the parallel streams PS1~PSN.

Figure 6:
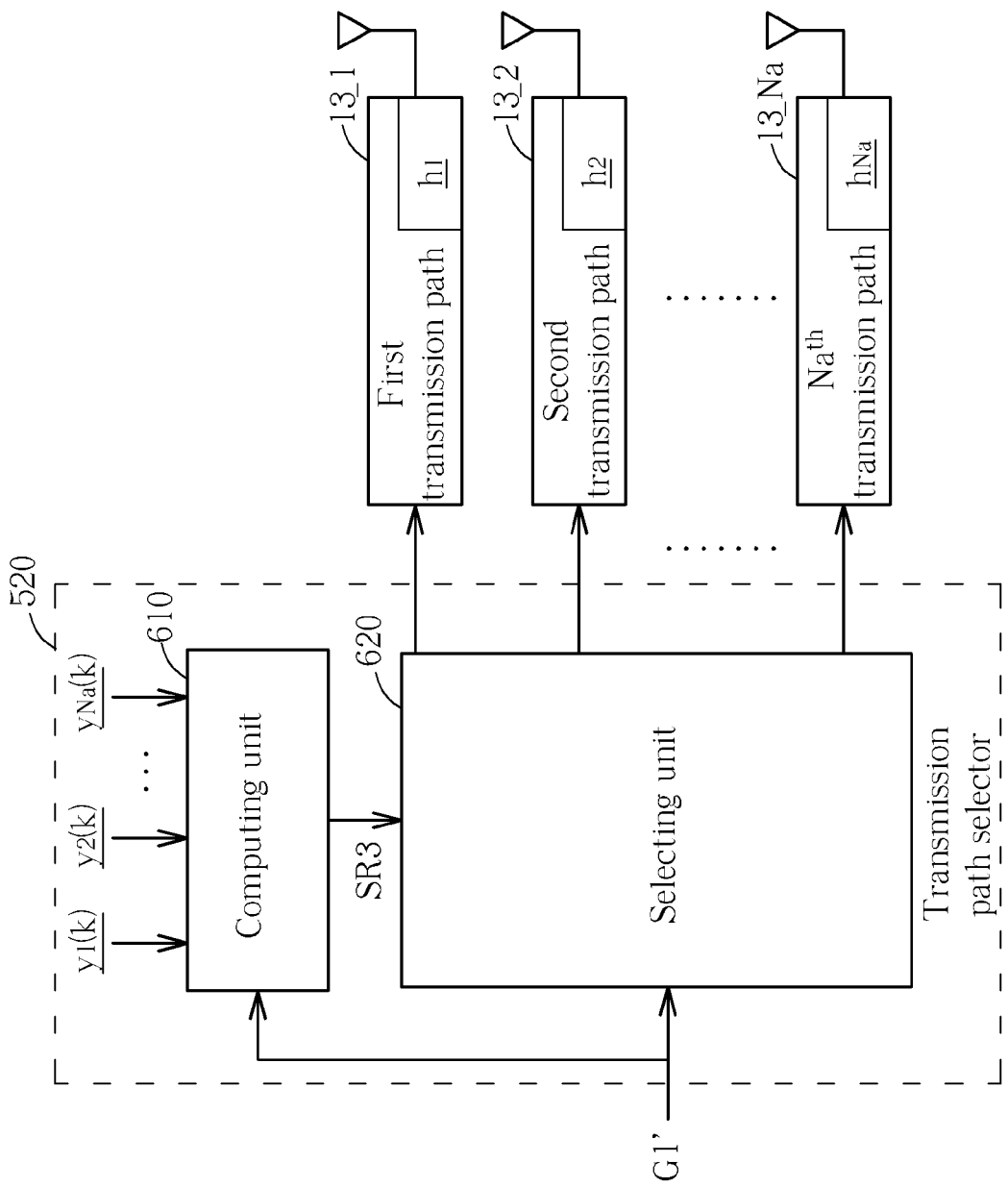
FIG. 6 is diagram illustrating an exemplary embodiment of the transmission path selector shown in FIG. 5.

Please refer to FIG. 6. FIG. 6 is diagram illustrating an exemplary embodiment of the transmission path selector 520 shown in FIG. 5. AS shown in FIG. 6, the transmission path selector 520 includes a computing unit 610 and a selecting unit 620. The computing unit 610 is used for comparing summations of energies of all received signals of each transmission path among the transmission paths 13_1~13_Na, in order to generate a comparison result SR3. The selecting unit 620 is coupled to the computing unit 610, for selecting a designated transmission path having a maximum summation of energies of the received signals from the transmission paths 13_1~13_Na according to the comparison result SR3, so as to transmit the parallel streams PS1~PSN carried by all of the sub-carriers SC1~SCN.

Continued from the preceding example, in this embodiment, the computing unit 610 and the selecting unit 620 of the transmission path selector 520 can be mathematically expressed as:

$$i_T = \arg\left\{\max_n\left\{\sum_k |y_n(k)|^2, n = 1 \ldots Na\right\}\right\};\qquad(4)$$

where n indicates the $n^{th}$ transmission path, $y_n(k)$ indicates a received signal under a receiving mode, and $i_T$ indicates the selected designated transmission path having the maximum summation of energies of the received signals.

Certainly, the abovementioned embodiments are presented merely for describing the present invention, but this is not a limitation of the present invention. Those skilled in the art should readily know that various modifications of the transmission path selectors 120, 420, and 520 may be made without departing from the spirit of the present invention, which also belongs to the scope of the present invention.

Please refer to FIG. 7~FIG. 11, respectively. Each one of FIG. 7~FIG. 11 is a flowchart illustrating a transmit diversity method applied to a transmitting system according to an exemplary embodiment of the present invention. Please note that the following steps are not limited to be performed according to the exact sequence shown in FIG. 7~FIG. 11 if a roughly identical result can be obtained.

Figure 7:
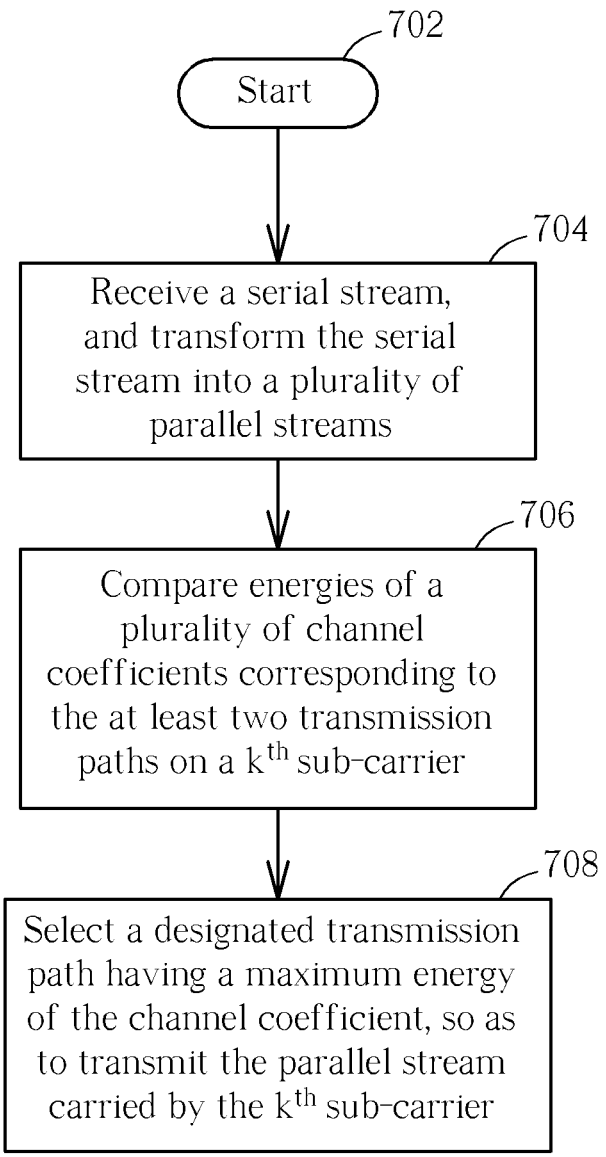
FIG. 7 is a flowchart illustrating a transmit diversity method applied to a transmitting system according to an exemplary embodiment of the present invention.

As shown in FIG. 7, the method includes, but is not limited to, the following steps:
Step 702: Start.
Step 704: Receive a serial stream, and transform the serial stream into a plurality of parallel streams, wherein each parallel stream is carried by a corresponding sub-carrier.
Step 706: Compare energies of a plurality of channel coefficients corresponding to the at least two transmission paths on a $k^{th}$ sub-carrier, in order to generate a comparison result.
Step 708: Select a designated transmission path having a maximum energy of the channel coefficient from the at least two transmission paths according to the comparison result, so as to transmit the parallel stream carried by the $k^{th}$ sub-carrier.

Figure 8:
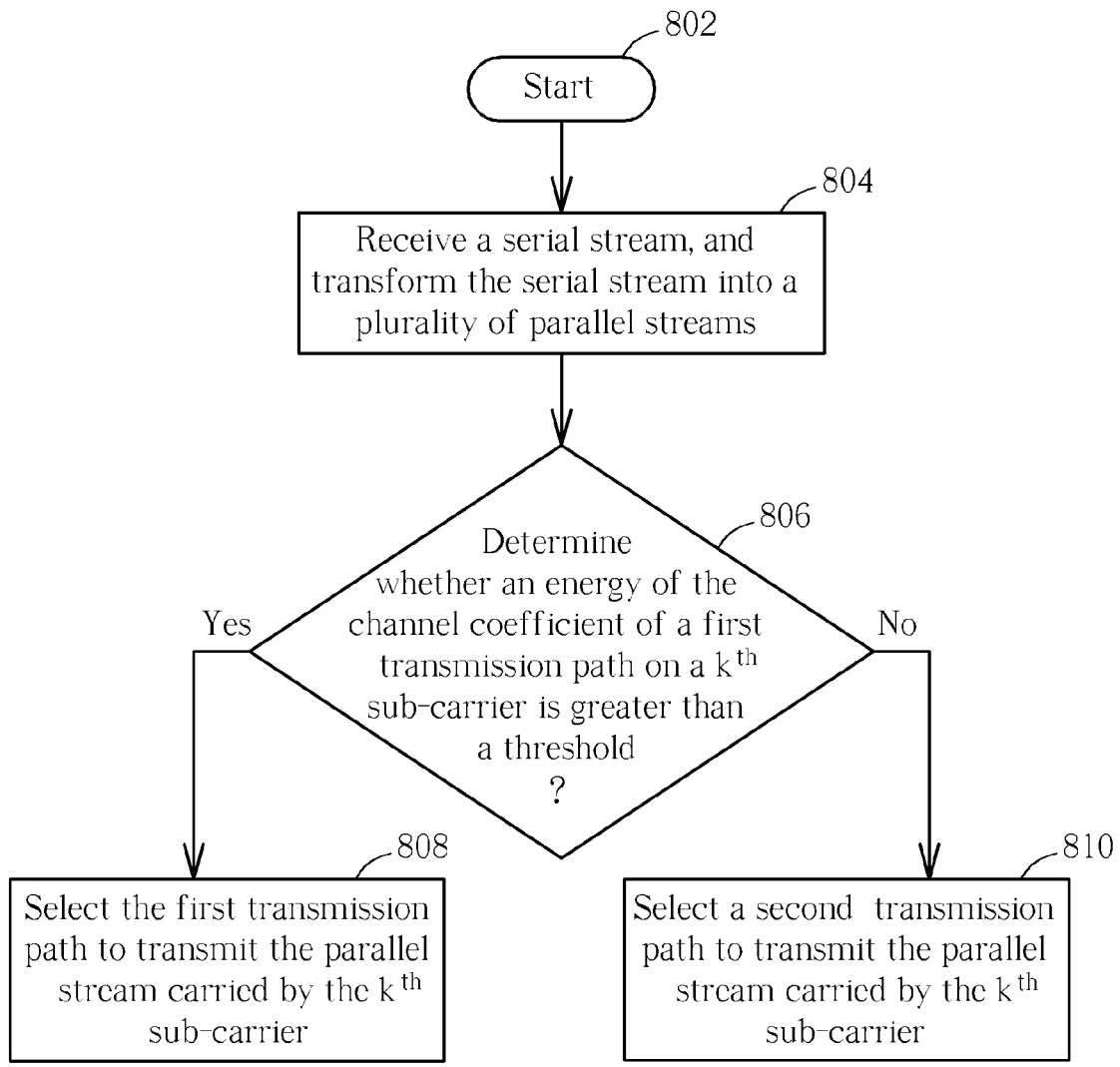
FIG. 8 is a flowchart illustrating a transmit diversity method applied to a transmitting system according to another exemplary embodiment of the present invention.

As shown in FIG. 8, the method includes, but is not limited to, the following steps:
Step 802: Start.
Step 804: Receive a serial stream, and transform the serial stream into a plurality of parallel streams, wherein each parallel stream is carried by a corresponding sub-carrier.
Step 806: Determine whether an energy of the channel coefficient of a first transmission path on a $k^{th}$ sub-carrier among the at least two transmission paths is greater than a threshold, in order to generate a determining result.
Step 808: When the determining result indicates that the energy of the channel coefficient of a first transmission path on a $k^{th}$ sub-carrier is greater than a threshold, select the first transmission path to transmit the parallel stream carried by the $k^{th}$ sub-carrier.
Step 810: When the determining result indicates that the energy of the channel coefficient of the first transmission path on the $k^{th}$ sub-carrier is smaller than the threshold, select a second transmission path to transmit the parallel stream carried by the $k^{th}$ sub-carrier.

Figure 9:
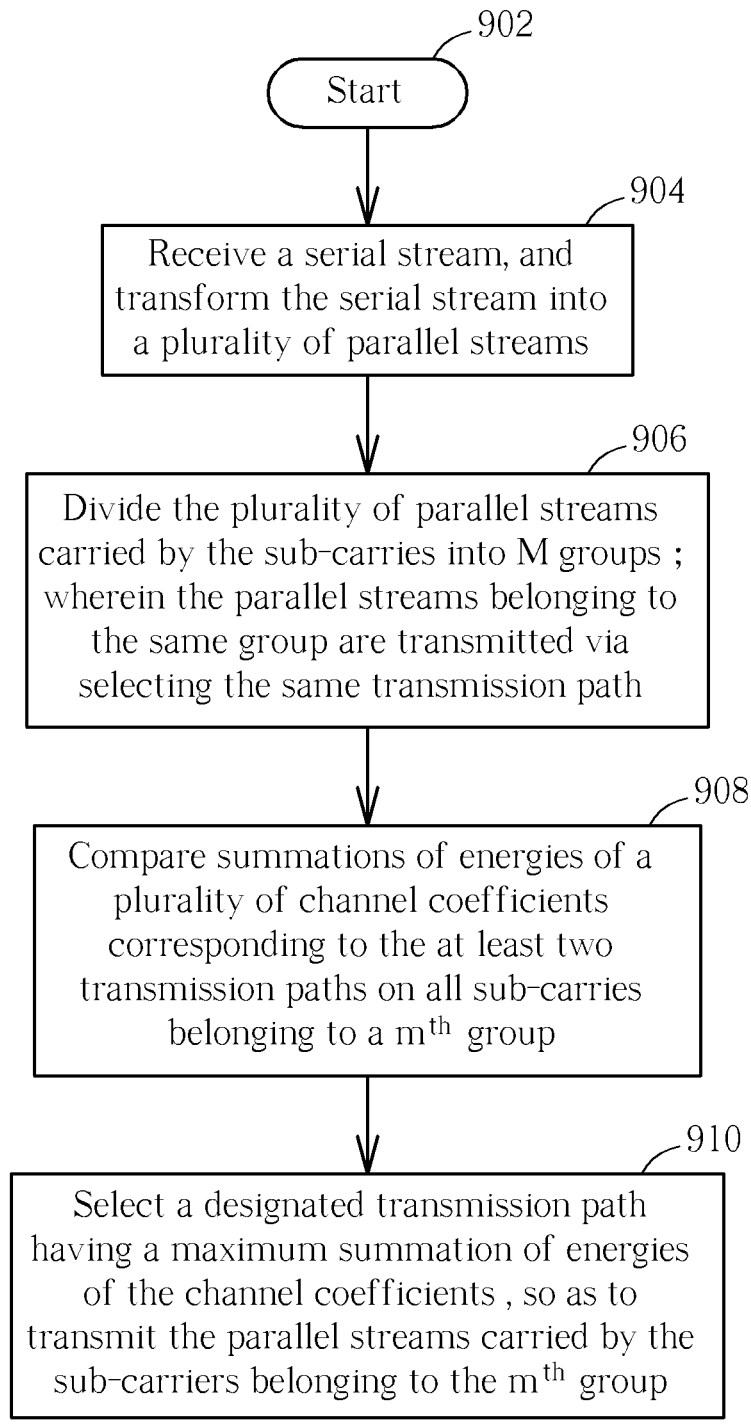
FIG. 9 is a flowchart illustrating a transmit diversity method applied to a transmitting system according to still another exemplary embodiment of the present invention.

As shown in FIG. 9, the method includes, but is not limited to, the following steps:
Step 902: Start.
Step 904: Receive a serial stream, and transform the serial stream into a plurality of parallel streams, wherein each parallel stream is carried by a corresponding sub-carrier.
Step 906: Divide the plurality of parallel streams carried by the sub-carries into M groups; wherein the parallel streams belonging to the same group are transmitted via selecting the same transmission path.
Step 908: Compare summations of energies of a plurality of channel coefficients corresponding to the at least two transmission paths on all sub-carries belonging to a $m^{th}$ group, in order to generate a comparison result.
Step 910: Select a designated transmission path having a maximum summation of energies of the channel coefficients from the at least two transmission paths according to the comparison result, so as to transmit the parallel streams carried by the sub-carriers belonging to the $m^{th}$ group.

Figure 10:
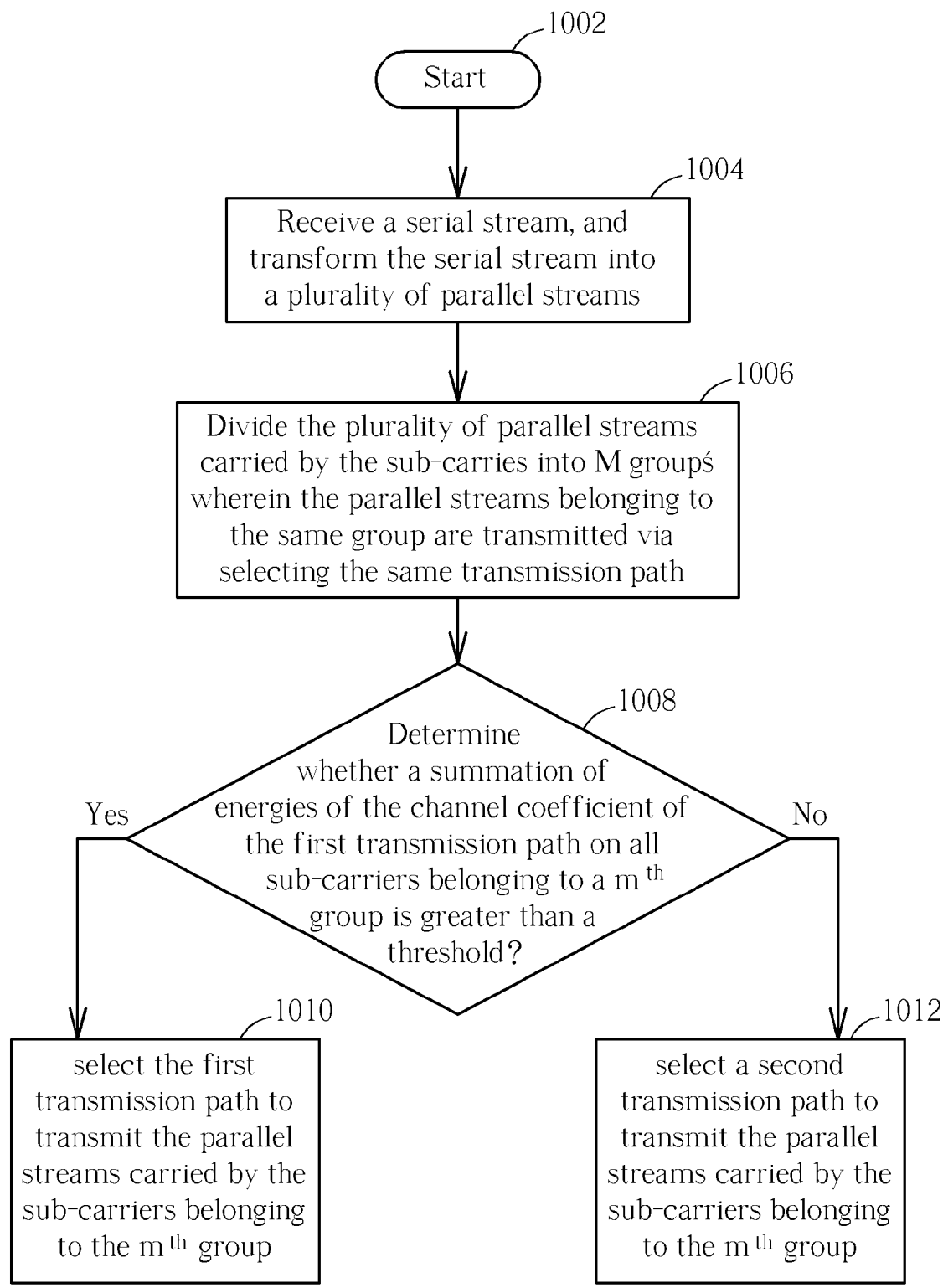
FIG. 10 is a flowchart illustrating a transmit diversity method applied to a transmitting system according to still another exemplary embodiment of the present invention.

As shown in FIG. 10, the method includes, but is not limited to, the following steps:
Step 1002: Start.
Step 1004: Receive a serial stream, and transform the serial stream into a plurality of parallel streams, wherein each parallel stream is carried by a corresponding sub-carrier.
Step 1006: Divide the plurality of parallel streams carried by the sub-carries into M groups; wherein the parallel streams belonging to the same group are transmitted via selecting the same transmission path.
Step 1008: Determine whether a summation of energies of the channel coefficient of the first transmission path on all sub-carriers belonging to a $m^{th}$ group is greater than a threshold, in order to generate a determining result.
Step 1010: When the determining result indicates that the summation of energies of the channel coefficient of a first transmission path on all sub-carriers belonging to a $m^{th}$ group is greater than a threshold, select the first transmission path to transmit the parallel streams carried by the sub-carriers belonging to the $m^{th}$ group.
Step 1012: When the determining result indicates that the summation of energies of the channel coefficient of the first transmission path on all sub-carriers belonging to the $m^{th}$ group is smaller than the threshold, select a second transmission path to transmit the parallel streams carried by the sub-carriers belonging to the $m^{th}$ group.

Figure 11:
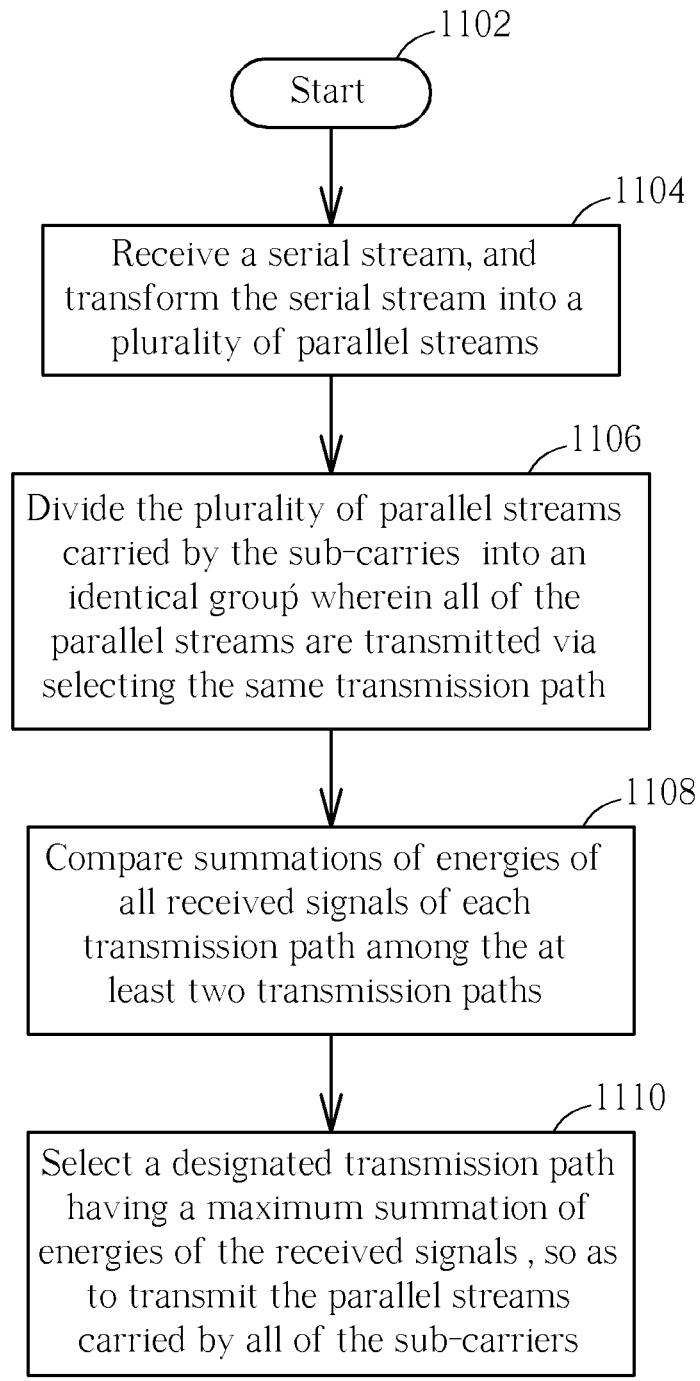
FIG. 11 is a flowchart illustrating a transmit diversity method applied to a transmitting system according to still another exemplary embodiment of the present invention.

As shown in FIG. 11, the method includes, but is not limited to, the following steps:
Step 1102: Start.
Step 1104: Receive a serial stream, and transform the serial stream into a plurality of parallel streams, wherein each parallel stream is carried by a corresponding sub-carrier.
Step 1106: Divide the plurality of parallel streams carried by the sub-carries into an identical group; wherein all of the parallel streams are transmitted via selecting the same transmission path.
Step 1108: Compare summations of energies of all received signals of each transmission path among the at least two transmission paths, in order to generate a comparison result.
Step 1110: Select a designated transmission path having a maximum summation of energies of the received signals from the at least two transmission paths according to the comparison result, so as to transmit the parallel streams carried by all of the sub-carriers.

Please note that, the steps of the abovementioned flowcharts are merely practicable embodiments of the present invention, and in no way should be considered to be limitations of the scope of the present invention. These methods can include other intermediate steps or several steps can be merged into a single step without departing from the spirit of the present invention. What calls for special attention is that: operations related to the steps shown in FIG7 can be known by collocating the steps shown in FIG. 7 and the elements shown in FIG. 1 and FIG. 2; operations related to the steps shown in FIG. 8 can be known by collocating the steps shown in FIG. 8 and the elements shown in FIG. 1 and FIG. 3; operations related to the steps shown in FIG. 9 can be known by collocating the steps shown in FIG. 9 and the elements shown in FIG. 4 and FIG. 2; operations related to the steps shown in FIG. 10 can be known by collocating the steps shown in FIG. 10 and the elements shown in FIG. 4 and FIG. 3; operations related to the steps shown in FIG. 11 can be known by collocating the steps shown in FIG. 11 and the elements shown in FIG. 5 and FIG. 6; and further description is omitted here for brevity.

The abovementioned embodiments are presented merely for describing features of the present invention, and in no way should be considered to be limitations of the scope of the present invention. In summary, the present invention provides a transmit diversity method applied to a transmitting system and a related transmitting system to solve the abovementioned problems. Before OFDM modulation, a transmission path selector is adopted for determining the transmission path used for transmitting the parallel stream carried by a sub-carrier for each sub-carrier, such that each sub-carrier can be transmitted with a transmission path having a best signal quality in terms of the sub-carrier. Because each sub-carrier is transmitted by selecting a single transmission path only, transmitting signals will not produce destructive superposition effects at the receiving end. Moreover, the receiving end can operate normally without any change. That is to say, under a principle of not altering the architecture of the receiving end, the receiving end can have a better receiving quality by adopting the transmit diversity method disclosed in the present invention. Additionally, the transmission path selector has less demand on accuracy of channel estimation, so less demand is required for hardware, which will not result in a burden in the computation and cost.

Those skilled in the art will readily observe that numerous modifications and alterations of the device and method may be made while retaining the teachings of the invention.

What is claimed is:

1. A transmit diversity method applied to a transmitting system, the transmitting system comprising at least two transmission paths, each of the at least two transmission paths has a channel coefficient, the method includes the steps of:
    receiving a serial stream, and transforming the serial stream into a plurality of parallel streams, wherein each parallel stream is carried by a corresponding sub-carrier; and
    in light of each sub-carrier, selecting a single transmission path from the at least two transmission paths of the transmitting system by comparing energies of a plurality of channel coefficients corresponding to the at least two transmission paths on the sub-carrier, so as to transmit the parallel stream carried by the sub-carrier;
    wherein the each channel coefficient is defined by y=h*s+N, where y is a receiving signal of the sub-carrier on the corresponding transmission path, h is the channel coefficient, s is a transmitting signal of the sub-carrier, and N is noise.

2. The transmit diversity method of claim 1, wherein the step of selecting the single transmission path from the at least two transmission paths so as to transmit the parallel stream carried by the sub-carrier comprises:
    comparing energies of a plurality of channel coefficients corresponding to the at least two transmission paths on a $k^{th}$ sub-carrier, where k=1, 2, . . . ; and
    selecting a designated transmission path having a maximum energy of the channel coefficient from the at least two transmission paths so as to transmit the parallel stream carried by the $k^{th}$ sub-carrier.

3. The transmit diversity method of claim 2, wherein the step of selecting the designated transmission path having the maximum energy of the channel coefficient from the at least two transmission paths can be mathematically expressed as:

$$i_T(k) = \arg\left\{\max_n |h_n(k)|^2, n = 1 \ldots Na\right\};$$

wherein $i_T(k)$ indicates the selected designated transmission path, n indicates the $n^{th}$ transmission path, $h_n(k)$ indicates the channel coefficient, and Na indicates a total number of the at least two transmission paths.

4. The transmit diversity method of claim 1, wherein each of the at least two transmission paths has a channel coefficient, and the step of selecting the single transmission path from the at least two transmission paths so as to transmit the parallel stream carried by the sub-carrier comprises:
    when an energy of the channel coefficient of a first transmission path on a $k^{th}$ sub-carrier among the at least two transmission paths is greater than a threshold, selecting the first transmission path to transmit the parallel stream carried by the $k^{th}$ sub-carrier, where k=1, 2, . . . ; and
    when the energy of the channel coefficient of the first transmission path on the $k^{th}$ sub-carrier is smaller than the threshold, selecting a second transmission path to transmit the parallel stream carried by the $k^{th}$ sub-carrier.

5. The transmit diversity method of claim 1, further comprising:
    dividing the plurality of parallel streams carried by the sub-carries into M groups, where M=1, 2, . . . ;
    wherein the parallel streams belonging to the same group are transmitted via selecting the same transmission path.

6. The transmit diversity method of claim 5, wherein each of the at least two transmission paths has a channel coefficient, and the step of selecting the single transmission path from the at least two transmission paths so as to transmit the parallel stream carried by the sub-carrier comprises:
    comparing summations of energies of a plurality of channel coefficients corresponding to the at least two transmission paths on all sub-carries belonging to a $m^{th}$ group, where m=1, 2, . . . ; and
    selecting a designated transmission path having a maximum summation of energies of the channel coefficients from the at least two transmission paths so as to transmit the parallel streams carried by the sub-carriers belonging to the $m^{th}$ group.

7. The transmit diversity method of claim 6, wherein the step of selecting the designated transmission path having the maximum summation of energies of the channel coefficients from the at least two transmission paths can be mathematically expressed as:

$$i_T(m) = \arg\left\{\max_n \left\{\sum_{k \in K_m} |h_n(k)|^2, n = 1 \ldots Na\right\}\right\};$$

wherein $i_T(m)$ indicates the selected designated transmission path, $K_m$ indicates all of the sub-carriers belonging to the $m^{th}$ group, n indicates the $n^{th}$ transmission path, $h_n(k)$ indicates the channel coefficient, and Na indicates a total number of the at least two transmission paths.

8. The transmit diversity method of claim 5, wherein each of the at least two transmission paths has a channel coefficient, and the step of selecting the single transmission path from the at least two transmission paths so as to transmit the parallel stream carried by the sub-carrier comprises:

when a summation of energies of the channel coefficient of a first transmission path among the at least two transmission paths on all sub-carriers belonging to a $m^{th}$ group is greater than a threshold, selecting the first transmission path to transmit the parallel streams carried by the sub-carriers belonging to the $m^{th}$ group, where m=1, 2, . . . ; and when the summation of energies of the channel coefficient of the first transmission path on all sub-carriers belonging to the $m^{th}$ group is smaller than the threshold, selecting a second transmission path to transmit the parallel streams carried by the sub-carriers belonging to the $m^{th}$ group.

9. The transmit diversity method of claim 1, further comprising:

dividing the plurality of parallel streams carried by the sub-carries into an identical group;

wherein all of the parallel streams are transmitted via selecting the same transmission path.

10. The transmit diversity method of claim 9, wherein the step of selecting the single transmission path from the at least two transmission paths so as to transmit the parallel stream carried by the sub-carrier comprises:

comparing summations of energies of all received signals of each transmission path among the at least two transmission paths; and selecting a designated transmission path having a maximum summation of energies of the received signals from the at least two transmission paths so as to transmit the parallel streams carried by all of the sub-carriers.

11. The transmit diversity method of claim 10, wherein the step of selecting the designated transmission path having a maximum summation of energies of the received signals from the at least two transmission paths can be mathematically expressed as:

$$i_T = \arg\left\{\max_n\left\{\sum_k |y_n(k)|^2, n = 1 \ldots Na\right\}\right\};$$

wherein $i_T$ indicates the selected designated transmission path, n indicates the $n^{th}$ transmission path, $y_n(k)$ indicates a received signal, and Na indicates a total number of the at least two transmission paths.

12. The transmit diversity method of claim 1, being applied to an orthogonal frequency-division multiplexing (OFDM) transmission.

13. A transmitting system having multi-transmission paths, comprising: a serial-to-parallel transform circuit, for receiving a serial stream, and for transforming the serial stream into a plurality of parallel streams, wherein each parallel stream is carried by a corresponding sub-carrier;

at least two transmission paths, wherein each of the at least two transmission paths has a channel coefficient; and a transmission path selector, coupled between the serial-to-parallel transform circuit and the at least two transmission paths;

wherein in light of each sub-carrier, the transmission path selector selects a single transmission path from the at least two transmission paths of the transmitting system by comparing energies of a plurality of channel coefficients corresponding to the at least two transmission paths on the sub-carrier, so as to transmit the parallel stream carried by the sub-carrier;

wherein the each channel coefficient is defined by y=h*s+ N, where y is a receiving signal of the sub-carrier on the corresponding transmission path, h is the channel coefficient, s is a transmitting signal of the sub-carrier, and N is noise.

14. The transmitting system of claim 13, wherein the transmission path selector comprises:

a computing unit, for comparing energies of a plurality of channel coefficients corresponding to the at least two transmission paths on a $k^{th}$ sub-carrier, in order to generate a comparison result, where k=1, 2, . . . ; and a selecting unit, coupled to the computing unit, for selecting a designated transmission path having a maximum energy of the channel coefficient from the at least two transmission paths according to the comparison result, so as to transmit the parallel stream carried by the $k^{th}$ sub-carrier.

15. The transmitting system of claim 14, wherein the computing unit and the selecting unit of the transmission path selector can be mathematically expressed as:

$$i_T(k) = \arg\left\{\max_n |h_n(k)|^2, n = 1 \ldots Na\right\};$$

wherein $i_T(k)$ indicates the selected designated transmission path, n indicates the $n^{th}$ transmission path, $h_n(k)$ indicates the channel coefficient, and Na indicates a total number of the at least two transmission paths.

16. The transmitting system of claim 13, wherein each of the at least two transmission paths has a channel coefficient, and the transmission path selector comprises:

a determining unit, for determining whether an energy of the channel coefficient of a first transmission path on a $k^{th}$ sub-carrier among the at least two transmission paths is greater than a threshold, in order to generate a determining result, where k=1, 2, . . . ; and a selecting unit, coupled to the determining unit, for selecting to use the first transmission path or a second transmission path to transmit the parallel stream carried by the $k^{th}$ sub-carrier according to the determining result;

wherein when the determining result indicates that the energy of the channel coefficient of the first transmission path on the $k^{th}$ sub-carrier is greater than the threshold, the selecting unit selects the first transmission path to transmit the parallel stream carried by the $k^{th}$ sub-carrier; and when the determining result indicates that the energy of the channel coefficient of the first transmission path on the $k^{th}$ sub-carrier is smaller than the threshold, the selecting unit selects the second transmission path to transmit the parallel stream carried by the $k^{th}$ sub-carrier.

17. The transmitting system of claim 13, further comprising:

a group dividing circuit, coupled between the serial-to-parallel transform circuit and the transmission path selector, for dividing the plurality of parallel streams carried by the sub-carries into M groups, where M=1, 2, . . . ;

wherein the parallel streams belonging to the same group are transmitted via selecting the same transmission path.

18. The transmitting system of claim 17, wherein each of the at least two transmission paths has a channel coefficient, and the transmission path selector comprises:

a computing unit, for comparing summations of energies of a plurality of channel coefficients corresponding to the at least two transmission paths on all sub-carries belonging to a $m^{th}$ group, in order to generate a comparison result, where m=1, 2, . . . ; and a selecting unit, coupled to the computing unit, for selecting a designated transmission path having a maximum summation of energies of the channel coefficients from the at least two transmission paths according to the comparison result, so as to transmit the parallel streams carried by the sub-carriers belonging to the $m^{th}$ group.

19. The transmitting system of claim 18, wherein the computing unit and the selecting unit of the transmission path selector can be mathematically expressed as:

$$i_T(m) = \arg\left\{\max_n\left\{\sum_{k\in K_m} |h_n(k)|^2, n = 1 \ldots Na\right\}\right\};$$

wherein $i_T(m)$ indicates the selected designated transmission path, $K_m$ indicates all of the sub-carriers belonging to the $m^{th}$ group, n indicates the $n^{th}$ transmission path, $h_n(k)$ indicates the channel coefficient, and Na indicates a total number of the at least two transmission paths.

20. The transmitting system of claim 17, wherein each of the at least two transmission paths has a channel coefficient, and the transmission path selector comprises:

a determining unit, for determining whether a summation of energies of the channel coefficient of a first transmission path among the at least two transmission paths on all sub-carriers belonging to a $m^{th}$ group is greater than a threshold, in order to generate a determining result, where m=1, 2, . . . ; and a selecting unit, coupled to the determining unit, for selecting to use the first transmission path or a second transmission path to transmit the parallel streams carried by the sub-carriers belonging to the $m^{th}$ group according to the determining result;

wherein when the determining result indicates that summation of energies of the channel coefficient of the first transmission path on all sub-carriers belonging to the $m^{th}$ group is greater than the threshold, the selecting unit selects the first transmission path to transmit the parallel streams carried by the sub-carriers belonging to the $m^{th}$ group; and when the determining result indicates that summation of energies of the channel coefficient of the first transmission path on all sub-carriers belonging to the $m^{th}$ group is smaller than the threshold, the selecting unit selects the second transmission path to transmit the parallel streams carried by the sub-carriers belonging to the $m^{th}$ group.

21. The transmitting system of claim 13, further comprising:

a group dividing circuit, coupled between the serial-to-parallel transform circuit and the transmission path selector, for dividing the plurality of parallel streams carried by the sub-carries into an identical groups;

wherein all of the parallel streams are transmitted via selecting the same transmission path.

22. The transmitting system of claim 21, wherein the transmission path selector comprises:

a computing unit, for comparing summations of energies of all received signals of each transmission path among the at least two transmission paths, in order to generate a comparison result; and a selecting unit, coupled to the computing unit, for selecting a designated transmission path having a maximum summation of energies of the received signals from the at least two transmission paths according to the comparison result, so as to transmit the parallel streams carried by all of the sub-carriers.

23. The transmitting system of claim 22, wherein the computing unit and the selecting unit of the transmission path selector can be mathematically expressed as:

$$i_T = \arg\left\{\max_n\left\{\sum_k |y_n(k)|^2, n = 1 \ldots Na\right\}\right\};$$

wherein $i_T$ indicates the selected designated transmission path, n indicates the $n^{th}$ transmission path, $y_n(k)$ indicates a received signal, and Na indicates a total number of the at least two transmission paths.

24. The transmitting system of claim 13, being applied to an orthogonal frequency-division multiplexing (OFDM) transmission.

* * * * *